Jan. 4, 1938.  B. A. E. JOHNSON  2,104,485
METHOD AND APPARATUS FOR MANUFACTURING COLLAPSIBLE TUBES
Filed Sept. 17, 1934  3 Sheets—Sheet 1

Inventor
Bror Anders Emil Johnson
By Sommers & Young
Attys.

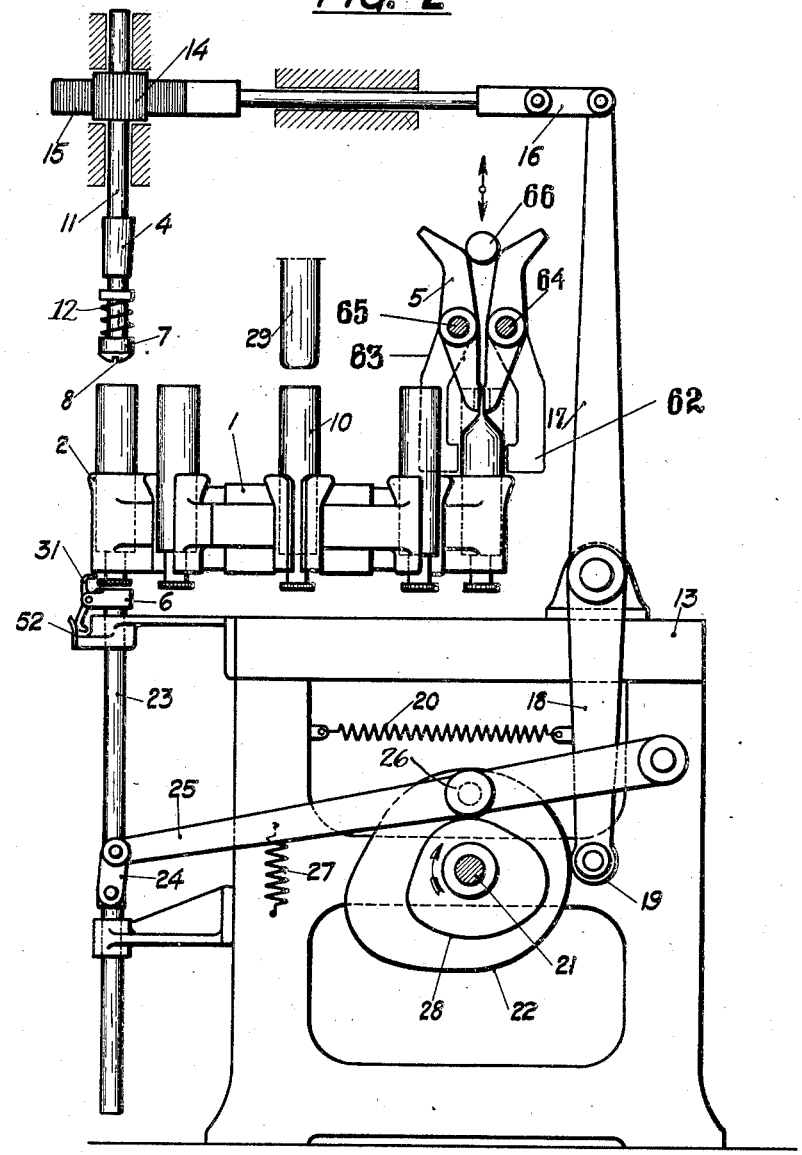

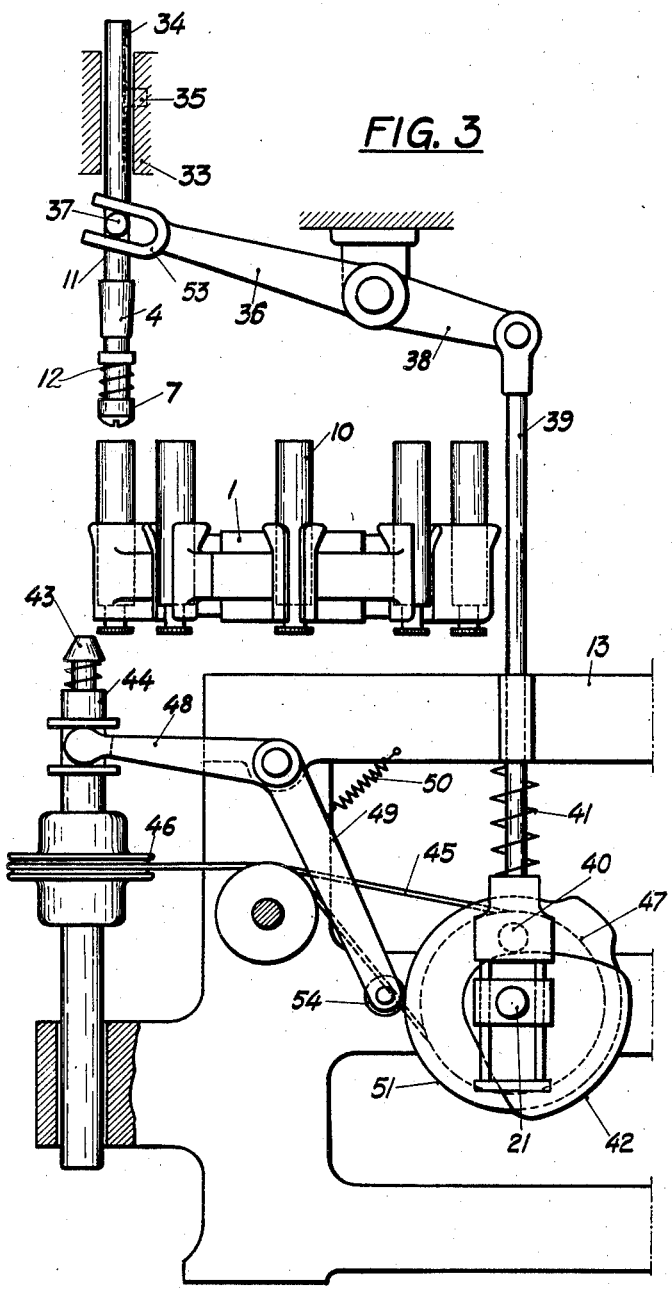

Patented Jan. 4, 1938

2,104,485

UNITED STATES PATENT OFFICE 2,104,485

METHOD AND APPARATUS FOR MANUFACTURING COLLAPSIBLE TUBES

Bror Anders Emil Johnson, Alsten, Sweden, assignor to Aktiebolaget Gerh. Arehns Mekaniska Verkstad, Stockholm, Sweden, a corporation of Sweden Application September 17, 1934, Serial No. 744,460
In Sweden September 21, 1933

13 Claims.  (Cl. 113—1)

This invention relates to a method of and apparatus for manufacturing collapsible tubes to seal them correctly with respect to the positions of stamps, labels or other designs previously or subsequently applied to said tubes.

If containers of regular cylindrical or prismatic shape that are to be subjected in a machine to a certain treatment for instance sealing, stamping or labelling have previously been provided with an imprint, label or the like it is important that the above mentioned sealing etc. is executed correctly relative to the imprint etc. Thus, owing to the fact that said sealing etc. is executed automatically it is important that the container is presented to the sealing mechanism etc. in a throughout correct angular position. This is the case for instance in machines for sealing collapsible paste tubes. The open ended tubes are stamped and their shape is mainly cylindrical. The tube is to be inserted into the machine by an operator, whose skill and attention determine whether the correct angular position for subsequent treatment will be obtained. This is particularly the case if the imprint is vague.

My present invention contemplates a method of and apparatus for manufacturing collapsible tubes removing the inconveniences above mentioned and rendering the result of further treatment, as for instance sealing completely independent of the skill of the operator who practically need not pay any attention at all to the fact whether the tube has been correctly applied to the machine or not.

In accordance therewith it is an object of my invention to turn collapsible tubes into correct positions and thereafter supply the articles to a mechanism for labelling, stamping, sealing or the like with the view of applying the seal, stamp, label etc. in correct relative positions.

In the drawings are by way of example shown embodiments of an apparatus for turning paste tubes into correct positions and means for further sealing of the tubes.

Fig. 2 is a side elevational view of the embodiment illustrated in Fig. 1;

Fig. 3 is a side elevational view of another embodiment of the invention; and

Figure 1:
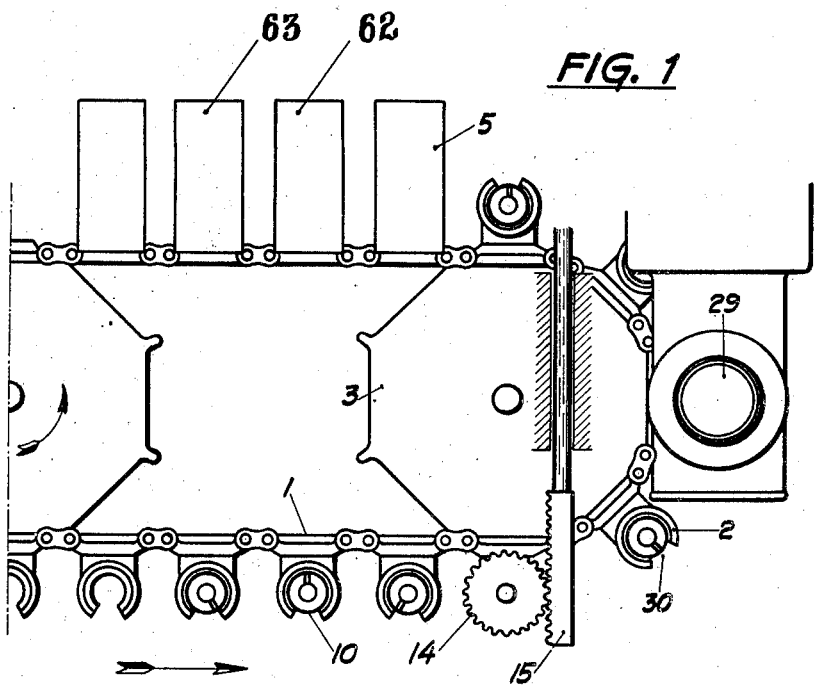
Fig. 1 is a plan view of an embodiment of the invention.
Figure 4:
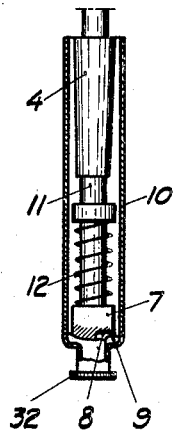
Fig. 4 is a side elevational view partly sectional of part of the apparatus enclosed by a tube, the latter being shown in longitudinal section.

Referring to the drawings an endless chain conveyor 1 is provided with vertical open ended pockets 2 for supporting the tubes. The pockets have longitudinal slots 30. The chain conveyor runs over sprocket wheels 3 which revolve stepwise so that the conveyor at each movement advances one step in the direction of the arrow (Fig. 1) each step corresponding to the distance between the centres of two adjacent pockets 2. Above the path of travel of the pockets there is provided an adjusting member 4 and tongs 5 for sealing the tubes. Below the conveyor 1 opposite to the adjusting member is provided an elevator member 6 having a hook 31.

The adjusting member 4 is provided with a driver 7 having a notch 8 which forms an abutment adapted to register with a projection 9 of the tube 10. The driver 7 is axially displaceable but not rotatably mounted on a spindle 11 of the adjusting member and it is forced down by a spring 12. The spindle is rotatably journalled but axially immovable in the machine frame 13. It is keyed to a gear wheel 14 which meshes with a rack 15 which is axially displaceable in the machine frame. One end of the rack is by means of a link 16 connected to one arm 17 of a double-armed lever the other arm 18 of which carries a roller 19 which is by a spring 20 pressed against the periphery of a cam disc 22 keyed to a continuously rotating driving shaft 21.

The member 6 is supported by a spindle 23, which is by means of a link 24 connected to a lever 25. The latter is provided with a roller 26 which is by means of a spring 27 pressed against a cam disc 28 keyed to the shaft 21.

The turning of the tubes is by means of the machine above described effected in the following manner:

The empty tube 10 having a cap 32 screwed thereto is inserted into a pocket 2 and moved stepwise in the direction of the arrow (Fig. 1) until it has obtained a position below the adjusting member 4. Then the elevator member 6 raises the tube and puts it around the adjusting member so that the driver 7 presses against the projection 9 of the tube. Thereafter or simultaneously the adjusting member is caused to revolve through a predetermined angle or a predetermined number of revolutions (conveniently one complete revolution) which is effected by swinging the lever 17, 18 thus moving the rack 15. Then the driver 7 will be coupled to the tube when the notch 8 is opposite to the projection 9 of the tube. On the continued angular movement of the adjusting member the latter will turn the tube into a predetermined angular position. As the cap 32 rests on the member 6, the turning movement of the tube 10 will screw the cap tight. Then the adjusting member is swung back to its initial position. After thus having reached its correct angular position the tube 10 is again moved down into the pocket 2 under the drawing action of the hook 31 embracing the cap 32 of the tube and thereafter the tube is moved by the conveyor to a filling station 29 and further to a sealing mechanism 5. To permit further transport of the tube in the direction of the arrow (Fig. 1) to the sealing mechanism the hook 31 will engage an abutment 52 on the machine frame when the rod 23 is retracted to the bottom position shown in Fig. 2. Thereby the upper finger of the hook will be swung outwards. As the tube rests in the carrier or pocket 2 when the latter is conveyed to the sealing mechanism 5 the tube will be presented to said mechanism at an angular position defined by that imparted to the tube by the turning operation described.

A stamping mechanism 62 for applying prints, and mechanism 63 for applying labels to the tubes are indicated diagrammatically in Fig. 1. As shown in Fig. 2, the stamping mechanism and labeling mechanism may be pivotally journalled on shafts 64 and 65, respectively, and are actuated by the rod 66 in the same manner as sealing tongs 5, that is, by moving the rod 66 up and down to swing the pivoted members about their pivots.

The embodiment illustrated in Fig. 3 is likewise adapted for turning into correct position by means of relative angular movements of tube and adjusting member. The latter is in this case axially displaceable in a guide 33 but not rotatable. Rotative movement is prevented thereby that the spindle 11 is provided with a longitudinal notch 34 into which projects a pin 35 secured in the guide 33. One arm 36 of a double-armed lever forms a fork 53 which straddles a transverse pin 37 on the spindle 11. The other arm 38 of the lever is pivotally connected to one end of a rod 39 the other fork-shaped end of which carries a roller 40 which is by means of the spring 41 forced against a cam disc 42 on the shaft 21. For imparting to the tube 10 rotative movement there is provided beneath the conveyor 1 a conical friction roller 43 carried by a spindle 44. Rotative movement is imparted to the spindle 44 by means of a driving rope 45 running over a rope pulley 46 on the spindle 44 as well as over another rope pulley 47 keyed to the driving shaft 21. Moreover vertical movements are imparted to the spindle 44 by means of a double-armed lever one arm 48 of which straddles the spindle, its other arm 49 carrying a roller 54 which is by a spring 50 pressed against a cam disc 51 keyed to the driving shaft 21.

This device operates in the following manner:

After the tube 10 has been brought into position beneath the adjusting member the latter is moved down into the tube so that the driver 7 presses against the projection 9. Simultaneously or afterwards the rotating roller 43 ascends and is brought into engagement with cap 32 of the tube which cap is by frictional action caused to rotate until it has been screwed tight and then to rotate the tube until the driver 7 has been coupled to the projection 9 of the tube whereafter relative sliding movement of the tube and the friction roller takes place. When the tube has attained the angular position determined by the notch 8 of the stationary adjusting member 7, the latter is drawn out of the tube and the latter advances further towards the sealing mechanism.

I claim:

1. In the manufacture of collapsible tubes, the method which comprises taking an open ended tube having an irregularity, applying to the tube a cap loosely screwed thereto, rotating the tube and stopping the rotation when said irregularity reaches a position corresponding to the proper angular position for sealing of the tube, sealing the tube by flattening the open end, and utilizing the rotary movement of the tube for screwing the cap tight.

2. In the manufacture of collapsible tubes, the method which comprises taking an open ended tube having an irregularity, applying to the tube a cap loosely screwed thereto, applying between said cap and tube a frictional relative turning force, utilizing said turning force for screwing the cap tight and for rotating the tube to occupy a predetermined angular position defined by said irregularity, and subjecting the tube to sealing by flattening the open end of the tube in a direction appropriate to the angular position thereof.

3. In an apparatus having a mechanism for sealing by flattening an end of collapsible tubes provided with an irregularity, the combination of a tube carrier, a driving member having an abutment, means for rotating said driving member to register its abutment with the irregularity of the tube and further swing said irregularity into a predetermined position relative to said carrier, and means for moving said carrier together with said tube into a definite operative position relative to said sealing mechanism.

4. In an apparatus having a mechanism for sealing by flattening an end of collapsible tubes provided with a threaded cap and an irregularity, the combination of a tube carrier, a non-rotative stop member having an abutment, a driving member operative by means of friction to engage said cap and rotate said cap to be screwed to said tube and further rotate said tube to register its irregularity with the abutment of the stop member to make the irregularity of the tube assume a predetermined position relative to said carrier, and means for moving said carrier together with said tube into a definite operative position relative to said sealing mechanism, said driving member and said stop member being disposed on opposite sides of the path of said carrier.

5. In an apparatus having a mechanism for sealing by flattening an end of collapsible tubes provided with a threaded cap and an irregularity, the combination of a tube carrier, a driving member having an abutment, means for supporting said cap to engage said tube with said driving member, means for rotating said driving member to register its abutment with the irregularity of the tube and further rotate said tube to screw said tube into said cap and arrest the irregularity at a predetermined position relative to said carrier, and means for moving said carrier together with said tube into a definite operative position relative to said sealing mechanism, said supporting means being arranged to oppose by friction rotary motion of the cap resting thereon.

6. In an apparatus having a mechanism for sealing by flattening an end of collapsible tubes provided with an interior irregularity, a tube carrier, a non-rotative stop member having an abutment, means for moving said carrier into position opposite to said stop member, means for positioning the tube on said stop member, means for rotating the tube about said stop member to register its irregularity with the abutment of said stop member, and means for moving said carrier together with said tube from said stop member into a definite operative position relative to said sealing mechanism.

7. In an apparatus having a mechanism for sealing by flattening an end of collapsible tubes provided with an interior irregularity, a tube carrier, a mandrel having a driver, means for moving said carrier into position opposite to said mandrel, means for positioning the tube on said mandrel, means for rotating said mandrel to couple said driver to the irregularity of a tube enclosing said mandrel, and arresting the rotary movement of said mandrel at a predetermined angular position to make said irregularity assume a predetermined position relative to said carrier, and means for moving said carrier together with said tube from said mandrel into a definite operative position relative to said sealing mechanism.

8. In an apparatus having a mechanism for sealing by flattening an end of collapsible tubes provided with an interior irregularity, a tube carrier, a mandrel having a driver, means for moving said carrier into position opposite to said mandrel, means for moving said mandrel into a tube in said carrier, means for rotating said mandrel to couple said driver to the irregularity of the tube, and arresting the rotary movement of said mandrel at a predetermined angular position to make said irregularity assume a predetermined position relative to said carrier, means for retracting said mandrel, and means for moving said carrier together with said tube from said mandrel into a definite operative position relative to said sealing mechanism.

9. In an apparatus having a mechanism for sealing by flattening the ends of collapsible tubes provided with irregularities, a tube carrier, a mandrel for engaging an irregularity of a tube to rotate said tube and make said irregularity assume a predetermined position relative to said carrier, means for moving said carrier together with said tube into a definite operative position relative to said sealing mechanism, and means for imparting to said mandrel rotary motion in one direction and then in the opposite direction from an initial angular position and back to said initial position.

10. In the manufacture of collapsible tubes the method which comprises taking an open-ended tube having an interior irregularity and an exterior design, rotating the tube about its longitudinal axis, utilizing the irregularity for arresting the rotary movement of the tube at a definite angular position, and sealing the tube by collapsing its open end to be flattened at a predetermined angle defined by said angular position.

11. In the manufacture of collapsible tubes the method which comprises taking an open-ended tube having an interior irregularity and an exterior design, rotating the tube about its longitudinal axis, utilizing the irregularity for arresting the rotary movement of the tube at a definite angular position, applying to said tube another design at a position thereon at an angle predetermined by said angular position, and sealing the tube by collapsing its open end to be flattened at the angle determined by said angular position.

12. In an apparatus having a mechanism for sealing by flattening an end of collapsible tubes provided with an interior irregularity, a tube carrier, a mandrel having an abutment, means for moving said carrier into position opposite to said mandrel, means for positioning said tube on said mandrel, means for rotating said mandrel and said tube relative to one another to engage said abutment with said irregularity to make the irregularity of the tube assume a predetermined position relative to said carrier, and means for moving said carrier together with said tube from said mandrel into a definite operative position relative to said sealing mechanism.

13. In an apparatus having a mechanism for sealing by flattening an end of collapsible tubes provided with a threaded cap and an irregularity, the combination of a tube carrier, a non-rotative stop member having an abutment, a driving member operative by means of friction to engage said cap and rotate said cap to be screwed to said tube and further rotate said tube to register its irregularity with the abutment of the stop member to make the irregularity of the tube assume a predetermined position relative to said carrier, and means for moving said carrier together with said tube into a definite operative position relative to said sealing mechanism.

BROR ANDERS EMIL JOHNSON.